Patented Jan. 19, 1937

2,068,016

UNITED STATES PATENT OFFICE 2,068,016

METHOD OF POLYMERIZING OLEFINS

Frederick H. Gayer, Detroit, Mich., assignor, by mesne assignments, to General Motors Corporation, Detroit, Mich., a corporation of Delaware No Drawing. Application March 6, 1933, Serial No. 659,842

9 Claims. (Cl. 196—10)

The invention relates to methods of polymerizing unsaturated hydrocarbons, particularly those of the olefin series, and substances employed in catalyzing such polymerization. It is known that the unsaturated hydrocarbons are capable of being polymerized to form compounds of higher boiling points. The polymers whose boiling points fall within the proper range for internal combustion engine fuels possess especially high antiknock properties and are therefore valuable constituents in fuels for high compression engines. Many of the polymers are also suitable starting materials for various organic chemicals.

Ordinary methods of cracking petroleum or fractions thereof for the production of gasoline result in the formation of considerable quantities of gases of which a large proportion, often as much as one half, are olefins. The polymerization of the unsaturated constituents of such gases is therefore of particular interest as providing a means for preparing valuable products from a cheap and convenient source. Other sources of the materials may also be employed.

I have found that the unsaturated hydrocarbons, for example propylene, butylenes, amylenes, etc. are readily polymerized in the presence of certain catalysts. My invention therefore is particularly concerned with polymerizing methods including the use of these catalysts and also with the preparation of the catalysts, per se.

It has been proposed to use for polymerizing olefins such catalysts as fuller's earth, and floridin. Synthetic mixtures containing silica and alumina such, for example, as those obtained by mutual precipitation of silica and alumina from solutions of sodium silicate and aluminum chloride are, however, much more active in promoting these particular reactions than are the natural earths. I have also found that, by a new method of preparing the mixture, a greatly increased activity in catalyzing the polymerizing reaction is effected. The method I have devised for this purpose is as follows:

A gel or gelatinous precipitate of silica is prepared, as by precipitation from sodium silicate by addition of an equivalent or excess amount of acid. The precipitate is washed until the wash water is practically free of the anion of the acid. Continued washing may cause the larger grains of the precipitate to turn slightly alkaline to phenolphthalein, even when an excess of acid has been used in the precipitation. While a slight alkalinity does not greatly impair the quality of the final product the best results are obtained if the precipitate, after washing, is of substantially neutral reaction.

The washed gel while still wet or only slightly dehydrated is treated with a solution of an aluminum salt, preferably a sulphate or chloride. This treatment may be at room or higher temperature and at atmospheric or higher pressure. During this treatment, hydrolytic adsorption of hydrated aluminum oxide takes place on the gel or gelatinous precipitate. As a result of the adsorption, acid is set free in proportion to the aluminum oxide adsorbed. The gel or gelatinous precipitate is now washed with water to remove the acid and any excess of salt, washing being continued until the wash water is free of the anion of the aluminum salt. To remove the last traces of the anion the gel may be heated with water. The gel or gelatinous precipitate is then dried in air and dehydrated, or dehydrated directly, at or above the temperature at which it is to be used as a catalyst. Dehydration is continued until an optimum water content is reached which is chiefly chemically combined water.

As a specific example, I take 10 liters of sodium silicate solution of 1.2 specific gravity containing 63 grams of $Na_2O$ per liter and add 5 liters of five normal hydrochloric or sulphuric acid with constant stirring. The precipitate is washed until the disappearance of the chloride or sulphate reaction and to the drained but still wet precipitate is added a dilute solution of aluminum sulphate in amount equivalent to 2 liters of normal aluminum sulphate per 1 kg. of silica calculated as dry $SiO_2$. Heating to the boiling point of the solution for a period of one hour completes the adsorption of hydrated alumina. After washing until the wash water is free of sulphate the precipitate is preferably heated with water whereby the last traces of sulphate are removed and the catalytic properties of the finished material are otherwise improved. The preparation is completed by dehydrating at a temperature which may approximate 300–400° C. until a water content of 4–6% is reached. The white, porous and highly adsorptive material thus obtained contains about 1% alumina. While approximately 4–6% of water has been found to give optimum results this content may vary considerably outside of these limits, the activity of the catalyst decreasing, however, in proportion with the departure from the optimum content.

The time required for treatment with aluminum sulphate solution varies somewhat depending upon the concentration. The more concentrated the solution, the shorter the time required to attain maximum activity. However the time may be shortened by treatment at higher temperatures.

The material prepared as above described is extremely active in catalyzing the polymerization of unsaturated hydrocarbons higher than ethylene. For polymerizing olefins, for example propylene, the catalyst may be charged in a reaction chamber maintained at a temperature of 300–400° C., preferably 340–350° C., and the olefin conducted over the catalyst at a rate yielding the maximum amount of polymer per unit of time and per unit of catalyst. Branched chain olefins, such for example as isobutylene, trimethylethylene, etc. may be polymerized at much lower temperatures, some, as for instance trimethylethylene, even in the liquid phase at ordinary or room temperature.

As a specific example, the catalyst above described is placed in a reaction tube kept at a temperature of 340° C. Pure propylene is conducted over the catalyst at atmospheric pressure. By cooling the outgoing gas, liquid hydrocarbons are obtained 90–95% of which boil below 220° C. and are capable of use as engine fuel, being a high grade, volatile product of high anti-knock rating. The fraction boiling below 150° C. consists of a continuous range of homologous olefins from $C_5H_{10}$ to $C_9H_{18}$ which are suitable starting materials for various organic chemicals. The unreacted propylene may again be passed through the reaction chamber until substantially 100% of yield of polymers is obtained.

I have found also that the polymerizing action of the synthetic silica-alumina catalyst is increased by the presence of traces of halogen acids, especially hydrochloric or hydrobromic acid. The activity of the catalyst is not only increased but is rendered more uniform and permanent, the decrease in activity being much slower when the acids are present. The amount of acid should be restricted since otherwise it may recombine with the olefin polymers to form higher alkyl halides.

As a convenient and highly effective method of introducing the halogen acid, I use an organic halogen compound, e. g., an alkyl halide, as the source. Such compounds, which may be formed by mere addition of halogen acids to unsaturated hydrocarbons at lower temperatures in the presence of certain catalysts, are readily decomposed at higher temperatures, in the presence of the same or other catalysts, to yield the acid and an organic residue. This reaction is utilized, in accordance with the present invention, to supply gaseous hydrochloric or hydrobromic acid in small and controlled quantities to the reaction chamber.

The organic halogen compound is conveniently supplied to the reacting gas before entering the reaction chamber as by conducting the gas over or through a liquid organic halogen compound which will decompose in the reaction chamber or on the way thereto. The amount of halogen compound taken up may be regulated by the temperature at which it is maintained since the vapor pressure depends upon the temperature. It may also be regulated by selecting a compound of suitable boiling point since the lower boiling compound will go over in greater quantities, other conditions remaining the same. Suitable selection of conditions, therefore, enables the operator to restrict the supply of halogen compound to mere traces. The amount is preferably not in excess of 1%, by volume, of the reacting gas or gas mixture.

The decomposition of the halogen compound may be effected at very high temperatures, e. g. 500–600° C., but decomposition is brought about by catalytic substances at much lower temperatures. A temperature of 300–400° C. is desirable for primary alkyl chlorides and over 400° C. for primary alkyl bromides. A lower temperature suffices for the decomposition of secondary and tertiary alkyl halides, which with some catalysts, decompose even below 200° C.

The catalysts for effecting the decomposition of the halogen compounds are either incorporated into the catalyst effecting the polymerization or may be placed separately therefrom in such position that the halogen compounds are decomposed before the gas reaches the polymerizing catalyst.

As a specific example, the olefin to be polymerized, e. g. propylene, is conducted over the surface of normal amyl chloride in a closed vessel at 0° C. At the proper rate of flow the propylene should take up less than one percent of its volume of the amyl chloride. The gaseous mixture is now conducted into a reaction tube kept at a temperature of about 350° C. and containing a catalyst promoting the polymerization of the propylene as hereinbefore described. The tube also contains a catalyst effecting the decomposition of the amyl chloride, for example, a synthetic combination of iron oxide and porous silica. The hydrochloric acid freed from the amyl chloride greatly increases the activity of the polymerizing catalyst, especially if the amyl chloride is introduced after the activity of the said catalyst has been somewhat decreased by previous use without the presence of the halide. The hydrochloric acid, after its adsorption on the catalytic surfaces reaches an equilibrium, leaves the reaction chamber along with the unreacted gases.

Among the catalysts suitable for effecting the decomposition of the organic halogen compounds may be mentioned anhydrous barium chloride, siliceous substances containing iron oxide, such as floridin, or synthetic combination of porous silica with iron oxide. The iron oxide composition is preferred, prepared by hydrolytic adsorption of hydrated iron oxides upon a gelatinous silica precipitate in a manner similar to that herein described for the preparation of the silica-alumina catalyst employed for polymerizing olefins. The manufacture of such catalyst containing iron oxide and silica and its use for promoting the addition of halogen acids to olefins is claimed in my copending application Ser. No. 659,843.

The reactions with which the present invention is concerned are not affected by the presence of gases which are usually found in the gaseous products of cracking petroleum or its fractions. Such gaseous products may therefore be used directly as the source of the olefins to be polymerized, provided they do not include a substantial content of air or oxygen, as oxygen appears to lessen the activity of the catalyst.

I claim:

1. The process of polymerizing lower boiling unsaturated olefin hydrocarbons of three or more carbon atoms comprising adding thereto in gaseous phase an alkyl chloride to the amount of not over approximately one percent by volume and passing the mixture over a mixture of catalysts, one effecting decomposition of the alkyl chloride to free hydrochloric acid and another effecting polymerization of the hydrocarbons in the presence of the acid.

2. The process of forming higher boiling hydrocarbons from lower boiling olefins of three or more carbon atoms comprising bringing a gaseous mixture of the olefin and a hydrogen halide acid into contact with a catalyst containing silica and alumina, the alumina having been deposited upon the silica by hydrolytic adsorption from a solution of an aluminum salt, and subsequently dehydrated.

3. The process of forming other hydrocarbons from lower boiling olefins of three or more carbon atoms comprising bringing a mixture of the olefin and an organic halide into contact with two catalytic agents, one active in decomposing the halide to yield a halogen acid and the other active in promoting combination of the olefins.

4. Process as set forth in claim 3, the first said catalyst being a combination of iron oxide and silica and the second being a combination of alumina and silica.

5. Process as set forth in claim 3, the halide being present to the amount of not more than approximately 1% of the mixture.

6. The process of polymerizing lower boiling olefins of three or more carbon atoms including bringing the olefins into contact with a catalyst comprising porous silica combined with alumina prepared by depositing alumina on the silica by hydrolytic adsorption from a solution of an aluminum salt, washing until free from the anion of the salt and drying the product, and supplying with the olefins a halogen acid.

7. The process as set forth in claim 6, the olefin being propylene, and the temperature of polymerization treatment being 300 to 400° C.

8. The process of producing other hydrocarbons from lower boiling olefins of three or more carbon atoms including preparing a gaseous mixture of the olefins with halogen acid, passing said mixture over a catalyst comprising porous silica having on its surfaces a coating of alumina, the temperature of the reacting mixture being maintained not materially in excess of 400 C.

9. Process as in claim 8, the halogen acid being supplied by forming a gaseous mixture of the olefins and an organic halide and passing the mixture over a catalyst operating to free the halogen acid at a temperature not materially above 400° C.

FREDERICK H. GAYER.